US011560089B2

(12) United States Patent
Hallundbæk

(10) Patent No.: US 11,560,089 B2
(45) Date of Patent: Jan. 24, 2023

(54) BUS WITH A VARIABLE HEIGHT WARNING SIGNAL

(71) Applicant: Alpha EC Industries 2018 S.à.r.l., Luxembourg (LU)

(72) Inventor: Jørgen Hallundbæk, Luxembourg (LU)

(73) Assignee: ALPHA EC INDUSTRIES 2018 S.A.R.L., Luxembourg (LU)

( * ) Notice: Subject to any disclaimer, the term of this patent is extended or adjusted under 35 U.S.C. 154(b) by 143 days.

(21) Appl. No.: 16/874,719

(22) Filed: May 15, 2020

(65) Prior Publication Data

US 2020/0361367 A1 Nov. 19, 2020

(30) Foreign Application Priority Data

May 15, 2019 (LU) ........................................ 101213

(51) Int. Cl.
| | | |
|---|---|---|
| *B60Q 1/50* | (2006.01) | |
| *B60J 1/08* | (2006.01) | |
| *B60J 1/18* | (2006.01) | |
| *B60Q 1/30* | (2006.01) | |
| *B60Q 1/32* | (2006.01) | |

(52) U.S. Cl.
CPC ........ *B60Q 1/50* (2013.01); *B60J 1/08* (2013.01); *B60J 1/18* (2013.01); *B60Q 1/30* (2013.01); *B60Q 1/32* (2013.01)

(58) Field of Classification Search
CPC ..... B60Q 1/50; B60Q 1/30; B60Q 1/32; B60J 1/08; B60J 1/18
See application file for complete search history.

(56) References Cited

U.S. PATENT DOCUMENTS

| | | | |
|---|---|---|---|
| 9,604,573 B2 | 3/2017 | Shimizu et al. | |
| 9,896,020 B2 | 2/2018 | Dellock et al. | |
| 9,902,315 B2 | 2/2018 | Salter et al. | |
| 11,010,622 B2 | 5/2021 | Naser et al. | |
| 2011/0163868 A1* | 7/2011 | Gustavsson | B60Q 1/46 340/468 |
| 2012/0303458 A1 | 11/2012 | Schuler, Jr. | |
| 2015/0043231 A1 | 2/2015 | Clark | |

(Continued)

FOREIGN PATENT DOCUMENTS

| | | |
|---|---|---|
| CN | 104827979 A | 8/2015 |
| CN | 205344659 U | 6/2016 |

(Continued)

OTHER PUBLICATIONS

Notice of Allowance from corresponding U.S. Appl. No. 16/874,726, dated Sep. 15, 2021, 9 pages.

(Continued)

*Primary Examiner* — Mohamed Barakat
(74) *Attorney, Agent, or Firm* — Rankin, Hill & Clark LLP

(57) ABSTRACT

A bus, notably an articulated low platform bus with an electric drive or a hybrid drive. The bus includes a vehicle detection module configured for detecting vehicle such as a car, a van or a motorbike, a height obtaining module adapted for obtaining the height of the detected vehicle, and a lighting system with a lighting surface adapted for displaying a luminous picture at least partially or totally above the height of the detected vehicle. The height of the luminous picture is adapted depending on the size of the vehicle for visibility purposes.

18 Claims, 8 Drawing Sheets

(56) References Cited

U.S. PATENT DOCUMENTS

| | | | |
|---|---|---|---|
| 2016/0167648 A1 | 6/2016 | James et al. | |
| 2016/0370645 A1* | 12/2016 | Tuzsuzov | G02F 1/133308 |
| 2017/0101056 A1 | 4/2017 | Park | |
| 2017/0355306 A1 | 12/2017 | Bellotti et al. | |
| 2018/0079359 A1 | 3/2018 | Park et al. | |
| 2018/0238516 A1 | 8/2018 | Fogg et al. | |
| 2018/0319325 A1* | 11/2018 | Tatara | B60Q 1/442 |
| 2019/0210616 A1* | 7/2019 | Watkins | B60Q 1/268 |
| 2020/0223352 A1* | 7/2020 | Toshio Kimura | B60Q 1/50 |
| 2020/0294431 A1* | 9/2020 | Nakajima | G09F 21/048 |

FOREIGN PATENT DOCUMENTS

| | | |
|---|---|---|
| DE | 102014211530 A1 | 12/2015 |
| DE | 202016103822 U1 | 9/2016 |
| DE | 102015109932 A1 | 12/2016 |
| DE | 102017008612 A1 | 3/2018 |
| EP | 3216653 A1 | 9/2017 |
| EP | 3369616 A1 | 9/2018 |
| JP | 2015-116983 A | 6/2015 |
| JP | 2015116983 A * | 6/2015 |
| JP | 2015-141881 A | 8/2015 |
| KR | 10-2012-0112003 A | 10/2012 |
| KR | 10-2016-0131197 A | 11/2016 |
| SE | 1751172 A1 | 7/2018 |
| WO | 2007/110654 A1 | 10/2007 |
| WO | 2008/157618 A2 | 12/2008 |
| WO | 2016/014966 A2 | 1/2016 |
| WO | 2017/138146 A1 | 8/2017 |
| WO | 2017/180900 A1 | 10/2017 |
| WO | 2019/048183 A1 | 3/2019 |

OTHER PUBLICATIONS

U.S. Office Action from corresponding U.S. Appl. No. 16/874,726, dated Feb. 12, 2021, 15 pages.
Luxembourg Search Report and Written Opinion, LU 101212, dated Jan. 22, 2020, 8 pages.

* cited by examiner

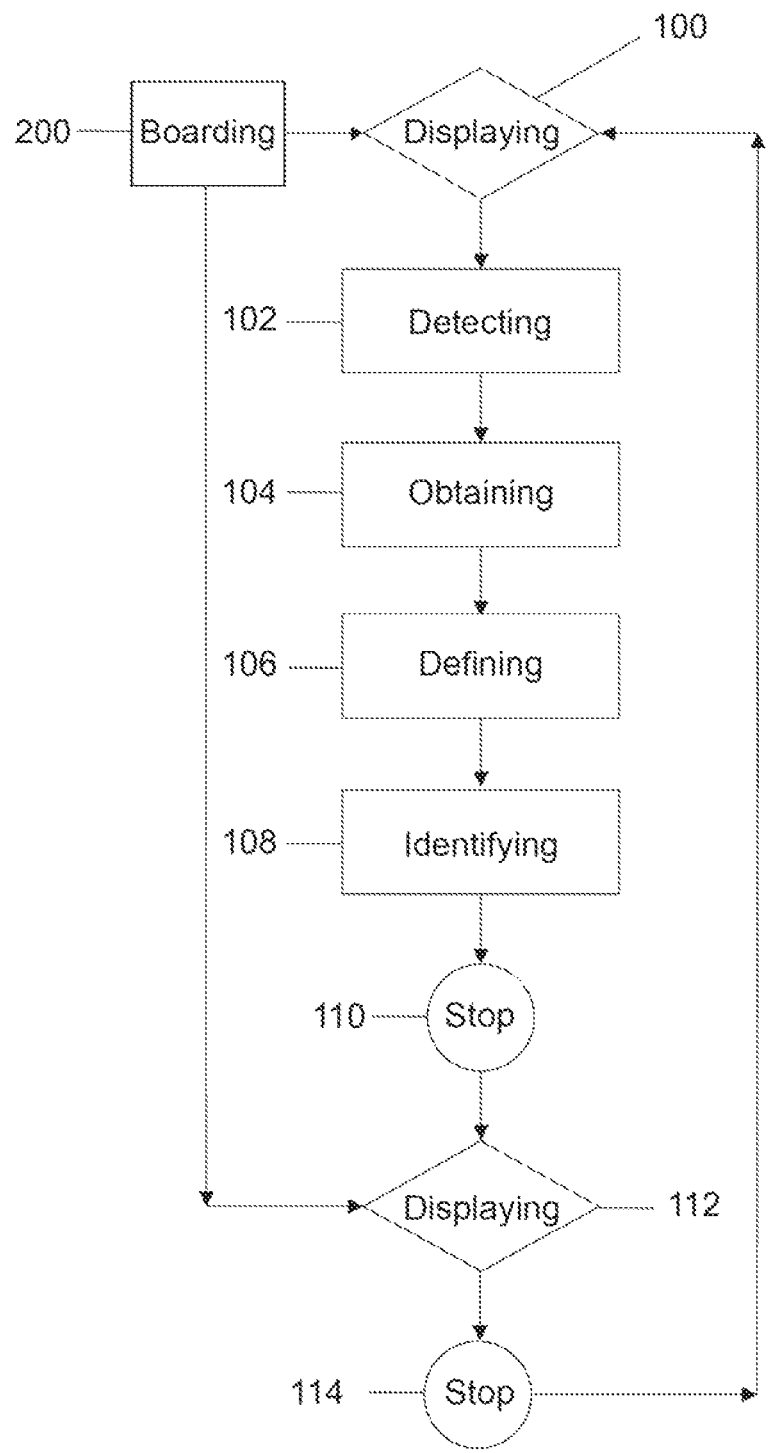

BUS WITH A VARIABLE HEIGHT WARNING SIGNAL

TECHNICAL FIELD

The invention lies in the field of luminous warning signals for vehicles. The invention offers a bus with an adaptive lighting system providing a luminous signal to the environment, and notably to other vehicles. The invention also provides a lighting process for a bus.

BACKGROUND OF THE INVENTION

Dense circulation in cities during rush hours remains hazardous for people such as pedestrians and cyclists. Indeed, pedestrians and cyclists need to cross roads between vehicles when the latter stop. However, each vehicle may hide a danger such as another vehicle driving in the opposite lane. If people do not check whether another vehicle arrives, an accident may occur. Children leaving a school bus are peculiarly exposed.

Vehicles may be dotted with lighting systems warning pedestrians that a dangerous situation is arising. Specific lights are provided. However, these lights require an important power consumption. In addition, pedestrians may fail to perceive the warning message, notably when they are focussed on said vehicle, or on another feature around. Moreover, the environment next to the vehicle may enclose masks hiding the lights, rendering the warning signals less effective.

Document JP 2015 116983 A deals with a vehicle with a lighting device.

Document US 2016/0167648 A1 relates to autonomous vehicle interaction with environment.

Technical Problem to be Solved

It is an objective of the invention to present a bus, which overcomes at least one of the disadvantages of the prior art. In particular, it is an objective of the invention to improve safety.

SUMMARY OF THE INVENTION

According to a first aspect of the invention, a bus is provided, notably an articulated bus. The bus comprises: a vehicle detection module configured for detecting a vehicle such as a car, a van or a motorbike, a height obtaining module configured for obtaining the height of the detected vehicle, a lighting system with a lighting surface adapted for displaying a luminous picture at least partially or totally above the height of the detected vehicle.

Preferably, the luminous picture is a second luminous picture, the lighting surface being further configured for displaying a first luminous picture at least partially below the height of the detected vehicle, the lighting system is notably configured for selectively switching from the first luminous picture to the second luminous picture.

Preferably, the first luminous picture comprises a first centre, and the second luminous picture comprises a second centre which is above the first centre, the second centre notably being above the height of the detected vehicle.

Preferably, the second luminous picture is higher than the first luminous picture, and/or the first luminous picture is lower than the second luminous picture.

Preferably, the first luminous picture comprises a first area, the second luminous picture comprises a second area which is smaller than the first area, the second area representing at most 50%, or 10% of the first area.

Preferably, the first luminous picture comprises a first width and a first height, the second luminous picture comprises a second width and a second height, the first width being larger than the second width and/or the first height is greater than the second height; the first width and the first height notably extending on the whole width and/or the whole height of the lighting surface.

Preferably, the first luminous picture comprises a first lighting intensity, and the second luminous picture comprises a second lighting intensity which is higher than the first lighting intensity.

Preferably, the first luminous picture comprises a first outline, and the second luminous picture comprises a second outline which is shorter than the first outline.

Preferably, the first luminous picture comprises a first number of first luminous portions, and the second luminous picture comprises a second number of second luminous portions said first number being greater than the second number.

Preferably, the bus comprises a window, the lighting surface extending on the whole surface of said window, the window notably being is a rear window or a side window.

Preferably, the window comprises an edge, the lighting surface overlapping said edge, the edge notably being an upper edge.

Preferably, the lighting system comprises a display screen, notably a matrix of light emitting diodes, said display screen forming the lighting surface, the display screen comprising a transparency of at least 40%.

Preferably, the bus comprises a bumper and a top, the lighting surface being vertically at distance from the bumper and/or the top. The top may be considered as a summit.

Preferably, the bus comprises a monitoring system adapted for detecting a danger and/or a road user, the vehicle detection module notably being part of said monitoring system, the lighting system being configured for displaying a luminous picture upon detection of said danger, the lighting system being configured such that the luminous picture is displayed toward said the road user.

Preferably, the luminous picture, notably the first luminous picture and/or the second luminous picture, is displayed in the field of visible light, notably with a frequency ranging from 400 THz to 770 THz.

Preferably, the first luminous picture comprises a first uppermost point, and the second luminous picture comprises a second uppermost point which is above the first uppermost point.

Preferably, the first luminous picture comprises a first lowermost point, and the second luminous picture comprises a second lowermost point which is above the first lowermost point.

Preferably, the height of the vehicle is a calculated height.

Preferably, the first luminous portions comprise at least one portion which is similar or identical to one of the second luminous portions or the second luminous picture.

Preferably, the second luminous picture overlaps the first luminous picture.

Preferably, the matrix of light emitting diodes comprises a pitch comprised between 10 mm and 40 mm, values included.

Preferably, the vehicle detection module is adapted for identifying a road user outside the bus, notably a pedestrian or a cyclist, the lighting system being configured such that the luminous picture meets said road user.

Preferably, the luminous picture comprises a warning signal, notably a flashing signal or a warning video.

Preferably, the luminous picture comprises a centre above the height of the detected vehicle.

Preferably, the second area represents at most: 20%, or 10% or 5% of the lighting surface.

Preferably, the luminous picture is displayed by a proportion of the lighting surface.

Preferably, the height of the vehicle is a maximum height or an average height.

Preferably, the lighting system is configured such that the lighting surface comprises a separation between the first luminous picture and the second luminous picture.

Preferably, the lighting surface comprises a height of at least 1 m, and a width of at least 1 m, preferably a height of at least 2 m, and a width of at least 2 m.

Preferably, the first area measures at least 1 m2; and the second area measures at most 0.50 m2.

Preferably, the lighting system is configured such that the detected vehicle is detected behind the bus.

Preferably, the lighting system is configured such that the detected vehicle is smaller than the bus, and/or the lighting surface is in elevation with respect to the detected vehicle.

Preferably, the lighting surface is a rear lighting surface.

Preferably, the lighting surface is configured for adapting the height of the luminous picture upon the height of the detected vehicle.

Preferably, the vehicle detection module is configured for detecting vehicle smaller than the bus and/or whose height is above the lighting surface.

Preferably, the second luminous picture overlaps the upper edge.

The feature "bus" is not an essential feature of the invention. It may be broadened to any vehicle or any vessel. The size of the vehicle is not an essential aspect of the invention.

It is another aspect of the invention to provide a bus which comprises: a vehicle detection module configured for detecting a vehicle such as a car, a van or a motorbike, a height obtaining module configured for obtaining the height of the vehicle, a lighting system with a lighting surface adapted for displaying a luminous picture at least partially or totally level with the roof and/or the top portion of said vehicle.

It is another aspect of the invention to provide an assembly for a vehicle, notably for a bus, the assembly comprising: a transparent glass, a vehicle detection module configured for detecting vehicle such as a car, a van or a motorbike, a size obtaining module adapted for obtaining the height of the detected vehicle, a lighting system with a lighting surface adapted for displaying a luminous picture at least partially or totally above the height of the detected vehicle, said lighting surface extending at least on the whole surface of the glass.

It is another aspect of the invention to provide a bus which comprises: a vehicle detection module configured for detecting a vehicle such as a car, a van or a motorbike, notably approaching from behind; a height obtaining module configured for obtaining the height of said vehicle, a lighting system with a lighting surface adapted for displaying a first luminous picture, and for displaying a second luminous picture at least partially above the height of said vehicle upon detection of said vehicle, wherein the first luminous picture is at least partially below said vehicle and/or below the second luminous picture.

It is another aspect of the invention to provide a lighting process for a bus, notably a low floor bus, said bus comprising a lighting system with a lighting surface adapted for displaying a luminous picture, notably a first luminous picture and a luminous picture, the lighting process comprising the steps: detecting a vehicle such as a car, a van or a motorbike, obtaining the height of the vehicle, displaying the luminous picture with the lighting surface, at least partially or totally, above and/or at the height of the vehicle, the bus notably being in accordance with the invention.

Preferably, at step obtaining the height is calculated by a computer of the bus.

Preferably, at step displaying the luminous picture is displayed toward said vehicle, said vehicle notably being behind the bus and/or approaching said bus.

Preferably, the lighting process comprises a step boarding during or before step displaying.

Preferably, the process further comprises a step identifying a road user with a vision field, the luminous picture emitting a light beam meeting the road user above the vehicle.

Preferably, the bus comprises a height of at least 3 m, and the height of the vehicle is of at least: 1.3 m; or 2 m, and the lighting surface comprises a height of at least 1 m, and a width of at least 1 m, preferably a height of at least 2 m, and a width of at least 2 m.

Preferably, at step displaying the bus forms a blind spot formed by two inclined units of said bus and/or the bus forms an angle.

Preferably, the two units form a blind spot and/or widen a blind spot for the vehicle.

Preferably, the height of the vehicle is higher than the height of the road user.

Preferably, at step detecting, the vehicle is at, at most: 100 m, or 50 m, or 30 m, or 20 m, or 10 m from the bus.

Preferably, the lighting process comprises a step calculating the blind spot formed by the inclined body of the articulated bus, notably when the articulated bus is in turn configuration.

Preferably, the process comprises a step comparing the size of bus and the vehicle; optionally step displaying the luminous picture, notably the second one; provided the bus is taller than the vehicle.

Preferably, at step detecting a vehicle, said vehicle is smaller than the bus, and/or the lighting surface is higher than said vehicle.

Step displaying the luminous picture is not an essential aspect of the invention. It may be replaced by a step adapting the height of the luminous picture, depending on the height of the vehicle, and/or in order to overlook said vehicle.

It is another aspect of the invention to provide an assembly process for a vehicle, notably for a bus, the assembly process comprising steps:

mounting a vehicle detection module configured for detecting vehicle such as a car, a van or a motorbike, mounting a size obtaining module adapted for obtaining the height of the detected vehicle, a lighting system with a
providing a transparent glass such as a window, mounting a lighting system with a lighting surface adapted for displaying a luminous picture from the transparent glass, the lighting surface notably comprising a first luminous picture and a luminous picture, wherein the lighting surface adapted for displaying a luminous picture at least partially or totally above the height of the detected vehicle, said lighting surface extending at least on the whole surface of the glass, the bus notably being in accordance with the invention.

It is another aspect of the invention to provide a computer program comprising computer readable code means, which when run on a computer cause the computer to run the lighting process according to the invention; preferably the bus is an articulated bus with at least two units and during step displaying the luminous picture the at least two units are inclined with respect to each other and which form a blind spot.

It is another aspect of the invention to provide a computer program product including a computer readable medium on which the computer program according to the invention is stored.

It is another aspect of the invention to provide a computer configured for carrying out the lighting process according to the invention.

The different aspects of the invention may be combined to each other. In addition, the preferable features of each aspect of the invention may be combined with the other aspects of the invention, unless the contrary is explicitly mentioned.

Technical Advantages of the Invention

The invention optimises the position of emitted luminous warning signal. The invention obtains the height of a vehicle, and displays a warning signal above this vehicle in order to increase is visibility. Then the warning reaction of the bus becomes more efficient.

In addition, the size of the luminous warning signal may be adapted, notably reduced, in order to save energy. The size of the warning signal may be compensated by a lighting intensity in order to maintain a safety level.

BRIEF DESCRIPTION OF THE DRAWINGS

Several embodiments of the present invention are illustrated by way of figures, which do not limit the scope of the invention, wherein FIG. 1 provides a schematic illustration of a side view of a bus in accordance with a preferred embodiment of the invention:

FIG. 8 provides a diagram block of a lighting process in accordance with a preferred embodiment of the invention.

DETAILED DESCRIPTION OF THE INVENTION

This section describes the invention in further detail based on preferred embodiments and on the figures. Similar reference numbers will be used to describe similar or the same concepts throughout different embodiments of the invention. For example, reference 2 denotes different embodiments of the vehicle in accordance with the invention.

It should be noted that features described for a specific embodiment described herein may be combined with the features of other embodiments unless the contrary is explicitly mentioned. Features commonly known in the art will not be explicitly mentioned for the sake of focusing on the features that are specific to the invention. For example, the vehicle in accordance with the invention is evidently dotted with a steering system, even though such steering system is not explicitly referenced on the figures nor referenced in the description.

By convention, the term vehicle may also designate the driver of said vehicle. Depending on the context, features defined in relation with the vehicle may actually apply to the driver therein.

By convention, it may be defined that the word "longitudinal" refers to the longitudinal direction and may correspond to the main driving direction of the bus. It may be along the main central axis of the vehicle. The word "transversal" refers to the transversal direction and may be perpendicular to the longitudinal direction. The words "rear" and "front" are in relation with the main or actual driving direction of the bus.

In the current invention, the light comprises the light visible by a human being.

Figure 1:
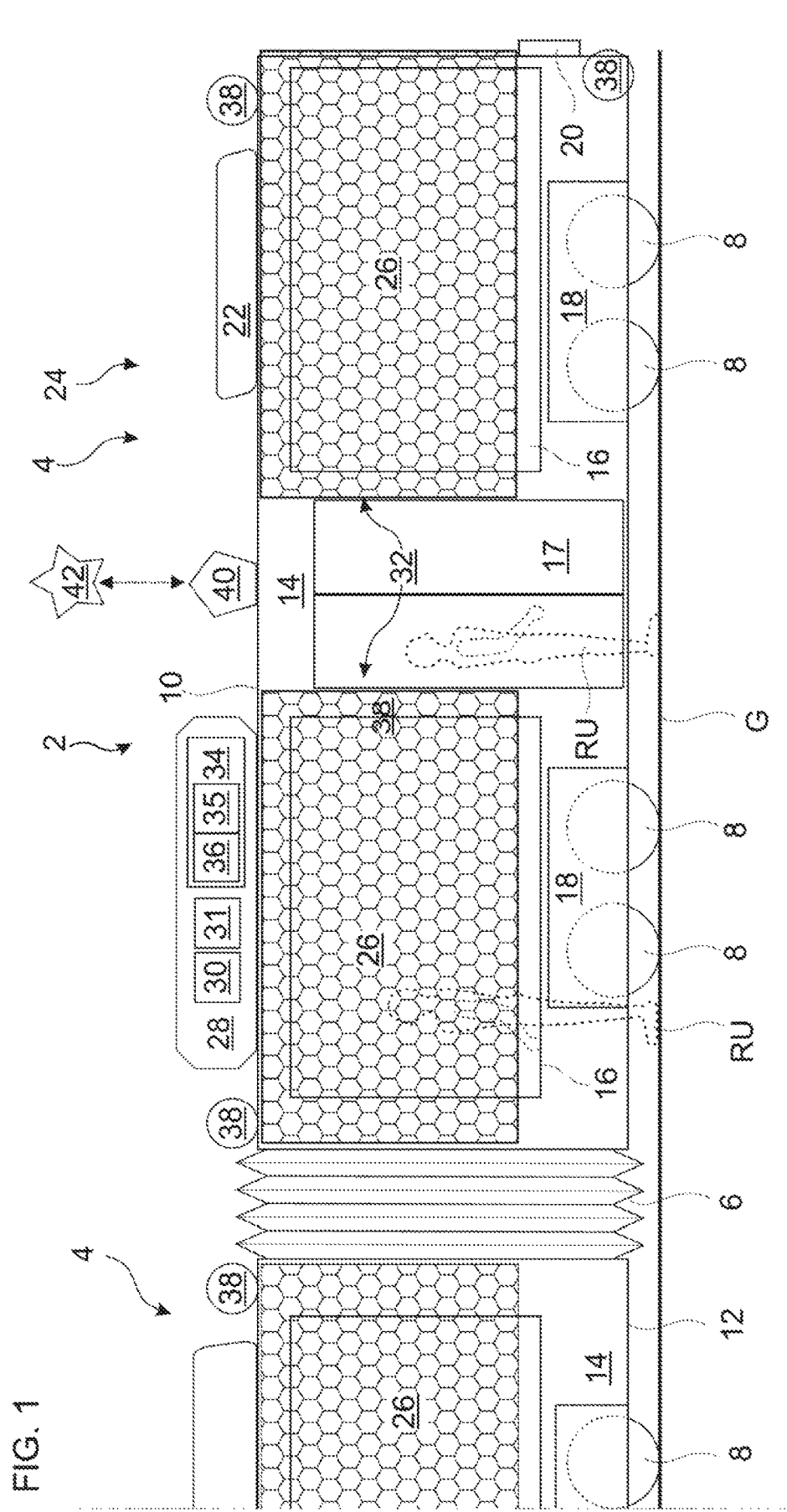

FIG. 1 shows a vehicle 2 for mass transportation in accordance with a preferred embodiment of the invention. The vehicle 2 is partially represented.

The vehicle 2 is adapted for transportation of passengers in cities and may transport about one hundred passengers, for instance one hundred and twenty passengers. The vehicle 2 may be a bus 2, notably an electric bus. The bus 2 may include electric driving engines and electric batteries (not represented) powering the electric driving engines. The bus 2 may be purely electric, in the meaning that it is free of combustion engine. It may be a hybrid bus, combining electric engines and a combustion engine.

The bus 2 may be an articulated bus. It may comprise a first unit 4 and a second unit 4 (partially represented). Each unit 4, also designated as cart, may form a body in the meaning of a rigid element. Each unit 4 may be a trailer and/or a tractor. The units 4 may be similar or identical. These units 4 may be joined by a connection, for instance a hinged connection 6 enabling the units 4 to swivel with respect to each other.

In the current embodiment, only two units 4 are represented, however it is contemplated in the current invention that the bus 2 includes three, four, or more units 4; which are articulated with respect to its neighbours by hinged connection(s) 6. Then, the passenger capacity may be of more than two hundred. Each unit 4 may be self-supporting. Thus, each unit 4 may move without the hinged connection 6.

A bus formed of a single unit is also considered in the current invention.

Each unit 4 may include several wheels 8 engaging the ground G. Pairs of symmetric wheels 8 may form axles, for instance four axles for each unit 4. The axles and thus the wheels 8 may be distributed along the length of the bus 2. At least one pair of wheels is formed of steered wheels.

Optionally, each wheel 8 of the bus 2 or of at least one unit 4 are steered wheels and/or driving wheels.

The bus 2 may include a roof 10, and/or a passenger platform 12, and/or side walls 14. The side walls 14 may be outer walls. Two transversally opposite side walls 14 may go down from the roof 10 to the passenger platform 12. The side walls 14 may receive windows 16 and doors 17 for passengers. Since the bus 2 may be a low floor bus, the height of the windows may be increased in order to illuminate the passenger compartment with the daylight. The roof 10 may support an air conditioning system, and another equipment 22 as well. The air conditioning system or the equipment 22 may form the top of the bus 2.

Optionally, doors 17 are arranged in one of the two side walls 14, notably between windows 16. For instance; the side walls 14 may close the wheel housings 18. Optionally, at least one or each wheel housing 18 may receive two longitudinally spaced wheels 8.

The bus 2 may comprise at least one bumper 20, notably a rear bumper and a front bumper (only one represented). Each bumper 20 may be adapted for absorbing a shock from another vehicle without damaging the whole structure of the bus 2. The shock may be classified as a low speed shock. At least one or each bumper 20 may protrude from the corresponding face, notably from the front end or the rear end respectively.

The bus 2 may comprise a lighting system 24 with a lighting surface 26 which fulfils the function of emitting light. The lighting system 24 is adapted for displaying at least one luminous picture (not represented), notably a first luminous picture and a second luminous picture. More generally, the lighting system 24 may be adapted for displaying a first lighting configuration and a second lighting configuration with the lighting surface 26. The first luminous picture and the second luminous picture may be displayed by different proportions, or different percentages, of the lighting surface 26. In order to display the luminous picture(s), the lighting surface 26 may keep portions that are switched off. Thus, the lighting surface 26 is partially powered.

The lighting system 24 may be at distance from each bumper 20, notably vertically at distance from the or each bumper 20.

The bus 2 may further comprise a monitoring system 28. The monitoring system 28 may comprise a vehicle detection module 30 configured for detecting other vehicles (not represented) in the surrounding of the bus 2. The vehicle detection module 30 may be adapted for, simultaneously, calculating the positions of the detected vehicles (not represented) with respect to the environment in which the bus 2 moves, and/or with respect to the bus 2. This cases calculation when the bus 2 drives.

The other vehicles may be stationary or driving. These other vehicles may be approaching while the bus 2 is stationary. The monitoring system 28 may be adapted for calculation the speed of the others vehicles. The vehicles may be considered as a rear vehicle. Indeed, it may be approaching from behind. The vehicle may be a so-called smaller vehicle, or a vehicle of reduced size. Said vehicle is smaller than the bus. It may be of reduced size with respect to the bus.

The monitoring system 28 may further comprise a height obtaining module 31. The height obtaining module 31 may be configured for obtaining the size of the detected vehicle(s) by the vehicle detection module 30. The height obtaining module 31 may be adapted for calculating the size of at least one or each of the detected vehicle 50. As an alternative, the height of the detected vehicle(s) may be communicated by other devices, notably directly by the detected vehicle(s). Road infrastructures may also provide the heights of the vehicles. Optical means may be used. The lighting system 24 may be configured for displaying a luminous picture at least partially or totally above the height of the detected vehicle. In case of several vehicles, the considered height may be the greatest height. Accordingly, the second luminous picture may be displayed by the lighting surface 26 from a location above the vehicle(s), and thus above the top 50 T of the vehicle 50. By way of illustration, the second luminous picture may be projected from a raised location with respect to the roof(s) 50R of the identified vehicle(s) 50.

The lighting surface 26 may be formed by at least one, or several display screens. The lighting surface 26 may be formed by at least one, or several matrices 32 of Light Emitting Diodes (LED). The diodes (not represented) forming at least one of the matrices 32 may have a pitch of about 20 mm. It may be understood that the diodes form a meshing, also designated as grid, with square meshes of about 20 mm. Triangular meshes or other shapes are considered as well.

The matrices 32 may be disposed at distance from the doors 17. The matrices 32 may cover the windows 16. Since the windows 16 are transparent, the lighting surface 26 and notably the matrices 32 may be transparent. For instance, at least one or each matrix 32 may exhibit a transparency of at least 40%, or more generally comprised between 10% and 50%; or 30% and 45%. A transparency of at least 40% may be understood as allowing a light passage of at least 40% through said matrix 32.

The bus 2 may comprise a computer 34, notably an inboard computer. The computer 34 may comprise a computer readable medium 36 and a processing unit 35. The computer readable medium 36 may store a source code for carrying out a lighting process, notably in accordance with the invention. The computer 34 may be connected to the lighting system 24 in order to allow a communication with the monitoring system 28, and notably with the vehicle detection module 30. At least one camera 38 may be used in order to detect other vehicles. Data provided by the cameras 38 may be sent to the vehicle detection module 30. Image recognition may be used for this purpose. Several cameras 38 may be distributed along the bus 2. Thus, the cameras 38 offer a precise view of the environment all along the bus 2. Cameras 38 at corners and/or along the edges of the roof 10 reduce blind spots in the vicinity of the hinged connection(s) 6. Indeed, when an articulated bus turns, blind areas appear in front of the hinged connection 6, at the acute angle side and/or at the obtuse angle side whereas pedestrians may walk in these blind spots. Displaying a luminous picture on a side portion of the lighting surface 26 may warn the pedestrians walking close to the hinged connection 6. Providing a warning luminous picture at the rear side of the bus 2 warns others vehicles that a danger is hidden in a corner formed by the articulated bus. There, the invention improves the environment perception, and consequently the safety.

The bus 2 stops regularly for boarding. Then passengers leave the passenger compartment and become road users RU such as pedestrians. These road users RU may walk close to the bus 2 on the road, and risk to be knocked over. This is a dangerous situation which may be automatically defined as such by the bus 2. This danger is higher with school buses. In such a situation, the monitoring system 28 may display the luminous picture through the lighting surface 26 in order to warn road vessels under approach.

As an alternative or in addition, communication means 40 may be used in order to obtain data from outer control system(s) 42 providing information on other vehicles. Said information may comprise the position and/or the height of said vehicle. Communication may be achieved through WIFI or 5G telecommunication standards.

The elevated position of the luminous picture increases the chances that this is seen by another road user, notably at a remote location. Thus, the lighting system prevents the vehicle from hiding the luminous picture which is however useful for the safety of the other. Accordingly, a luminous picture with a reduced size may be displayed, such that power consumption is reduced. In the context of an electric bus, the autonomy is prolonged.

Figure 2:
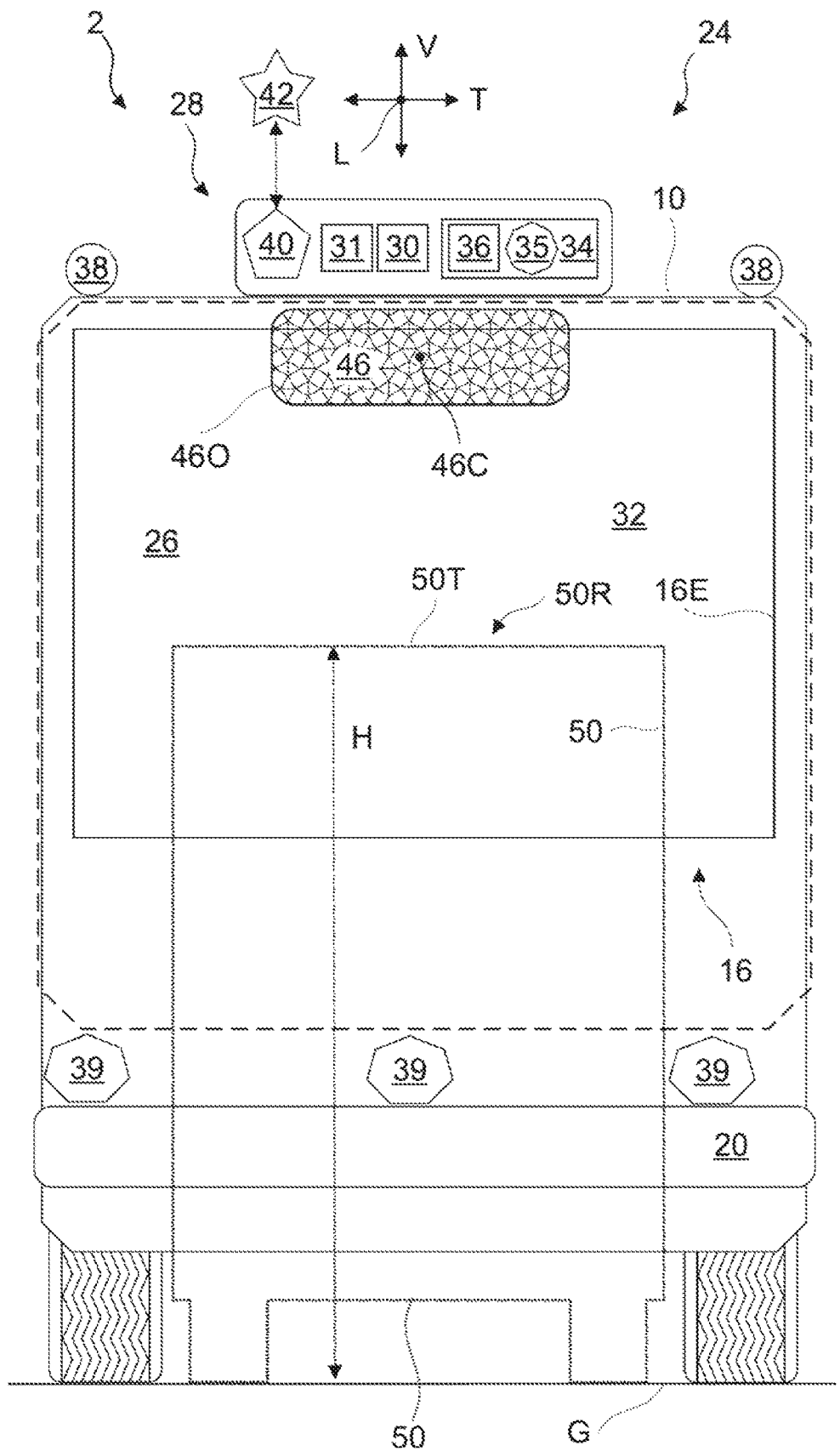
FIG. 2 provides a schematic illustration of a longitudinal view of a bus in accordance with a preferred embodiment of the invention.

FIG. 2 shows a longitudinal view—notably a rear view—of a bus 2 in accordance with a preferred embodiment of the invention. The bus 2 may correspond to the one as described in relation with FIG. 1. A vehicle 50 faces one longitudinal end of the bus 2, notably the rear end. The transversal direction T, the vertical direction V and the longitudinal direction L are represented.

The bus 2 may comprise a lighting system 24 with a lighting surface 26, or light emitting surface. The lighting system 24 is adapted for displaying at least one luminous picture 46, notably a first luminous picture and a second luminous picture 46. More generally, the lighting system 24 is adapted for displaying a first lighting configuration and a second lighting configuration with the lighting surface 26. The first luminous picture and the second luminous picture may be displayed by different proportions, or different percentages, of the lighting surface 26. In order to display the luminous picture(s), the lighting surface 26 may keep portions that are switched off. Thus, the lighting surface 26 is partially powered.

The lighting system 24 may be at distance from each bumper 20, notably vertically at distance from the or each bumper 20. The lighting surface 26 may have a transversal width of at least 1.5 m, and a height of at least 1 m. The lighting surface 26 may have a width of at least 2.5 in, and a height of at least 2 m. It may extend from one side wall 14 to the transversally opposite side wall 14.

The bus 2 may further comprise a monitoring system 28. The monitoring system 28 may comprise a vehicle detection module 30 configured for monitoring other vehicles 50 (only one represented) in the surrounding of the bus 2. The vehicle detection module 30 may be adapted for, simultaneously, calculating the position of the detected vehicles 50 with respect to the environment in which the bus 2 moves, and/or with respect to the bus 2; which may case calculation when the bus 2 drives.

The other vehicles 50 may be stationary or driving ones. These other vehicles 50 may be approaching while the bus 2 is stationary. The monitoring system 28 may be adapted for calculation the speed of the others vehicles 50.

The monitoring system 28 may further comprise a height obtaining module 31. The height obtaining module 31 may be configured for obtaining the size of the detected vehicle(s) 50 by the vehicle detection module 30. The height obtaining module 31 may be adapted for calculating the size of at least one or each of the detected vehicle 50. As an alternative, the height H of the detected vehicle(s) 50 may be communicated by other devices, notably directly by the detected vehicle(s). Road infrastructures may also provide the heights H of the vehicles.

By way of illustration, the vehicle 50 may comprise a height H of at least: 1.50 m; or 2.00 m; or 2.50 m; and the bus may comprise a height of at least: 2.50 m, or 3.00 m. The height H is measured from the ground G.

The lighting system 24 may be configured for displaying a luminous picture at least partially or totally above the height H of the detected vehicle. In case of several vehicles, the considered heights H may be the greatest height. Accordingly, the second luminous picture may be displayed by the lighting surface 26 from a location above the vehicle(s), and thus above the top 50 T of the vehicle 50. By way of illustration, the second luminous picture may be projected from a raised location with respect to the roof(s) 50R of the identified vehicle(s) 50. In the current figure, the roof 50R is flat. However, it may exhibit other shapes. It may support the equipment as well. The lighting surface 26 may be formed by at least one, or several screens. The lighting surface 26 may be formed by at least one, or several matrices 32 of Light Emitting Diodes (LED). The diodes (not represented) forming at least one of the matrices 32 may have a pitch of about 20 mm. It may be understood that the diodes form a meshing, also designated as grid, with square meshes of about 20 mm. Triangular meshes or other shapes are considered as well.

Since the windows 16 are transparent, the lighting surface 26 and notably the matrices 32 may be transparent. For instance, at least one or each matrix 32 may exhibit a transparency of at least 40%, or more generally comprised between 10% and 50%; or 30% and 45%. A transparency of at least 40% may be understood as allowing a light passage of at least 40% through said matrix 32.

The bus 2 may comprise a computer 34. The computer 34 may comprise a computer readable medium 36 and a processing unit 35. The computer readable medium 36 may support a source code for carrying out a lighting process, notably in accordance with the invention. The computer 34 may be connected to the lighting system 24 in order to allow a communication with the monitoring system 28, and notably with the vehicle detection module 30.

At least one camera 38 may be used in order to detect other vehicles. Data provided by the cameras 38 may be sent to the vehicle detection module 30. Image recognition may be used for this purpose. The cameras 38 may be supported by the roof 10 of the bus 2. Cameras may be arranged at corners of the bus 2. Several cameras 38 may provide data to the monitoring system 28. In the current figure, two cameras are represented, however any other number of cameras 38 may be considered.

In addition, ultrasound sensors 39 may be used. They may provide additional data to the monitoring system 28 in order to detect, and to assess the position of the vehicle 50.

As an alternative or in addition, communication means 40 may be used in order to obtain data from outer control system(s) 42 providing information on other vehicles. Said information may comprise the position and/or the height of said vehicle. Communication may be achieved through WIFI or 5G telecommunication standards.

The luminous picture 46 may have a rectangular shape. However different shapes are considered, such as a round or triangular shape. A complex shape such as a star is suitable. The luminous picture 46 may be a flashing luminous picture to underline a specific danger. Different colours visible by a human may be used. Accordingly, the luminous picture may have a wavelength ranging from 390 nm to 750 nm; values included.

The luminous picture 46 may have an outline 46O. The outline 46O may extend on the window 16, and may cross the edge 16E of the corresponding window 16. Thus, the luminous picture 46 may be partially displayed from the window 16 and from the bodywork of the bus 2. It may be at distance from the roof 10. It may be separated from the top of the bus 2. Accordingly, the lighting surface 26—and notably the luminous picture 46—is a vertical surface. The displayed light is sent horizontally toward other vehicles on the road.

The luminous picture 46 may comprise a centre 46C. The centre 46C may be at distance from the vehicle 50. It may be in elevation with respect to the roof 50R of said vehicle 50. Then a majority of the luminous picture 46 is emitted over the top 50T of the vehicle 50.

The outline 46O of the luminous picture 46 may be over the vehicle 50. It may be vertically at distance from the roof 50R of said vehicle 50. The lower point of the outline 46O may be at a higher location than the height H of the vehicle 50.

Accordingly, the luminous picture 46 is not hidden by the vehicle 50, and notably the mask it forms. More precisely, its position is optimized in order to dodge the surfaces of the vehicle 50. Other vehicles (not represented) behind the detected vehicle 50 may see the luminous picture 46 independently of their respective height. This result may be achieved without detecting these other vehicles, and without calculating their heights, positions or speeds. Thus, computation is easier whereas safety remains elevated.

Figure 3:
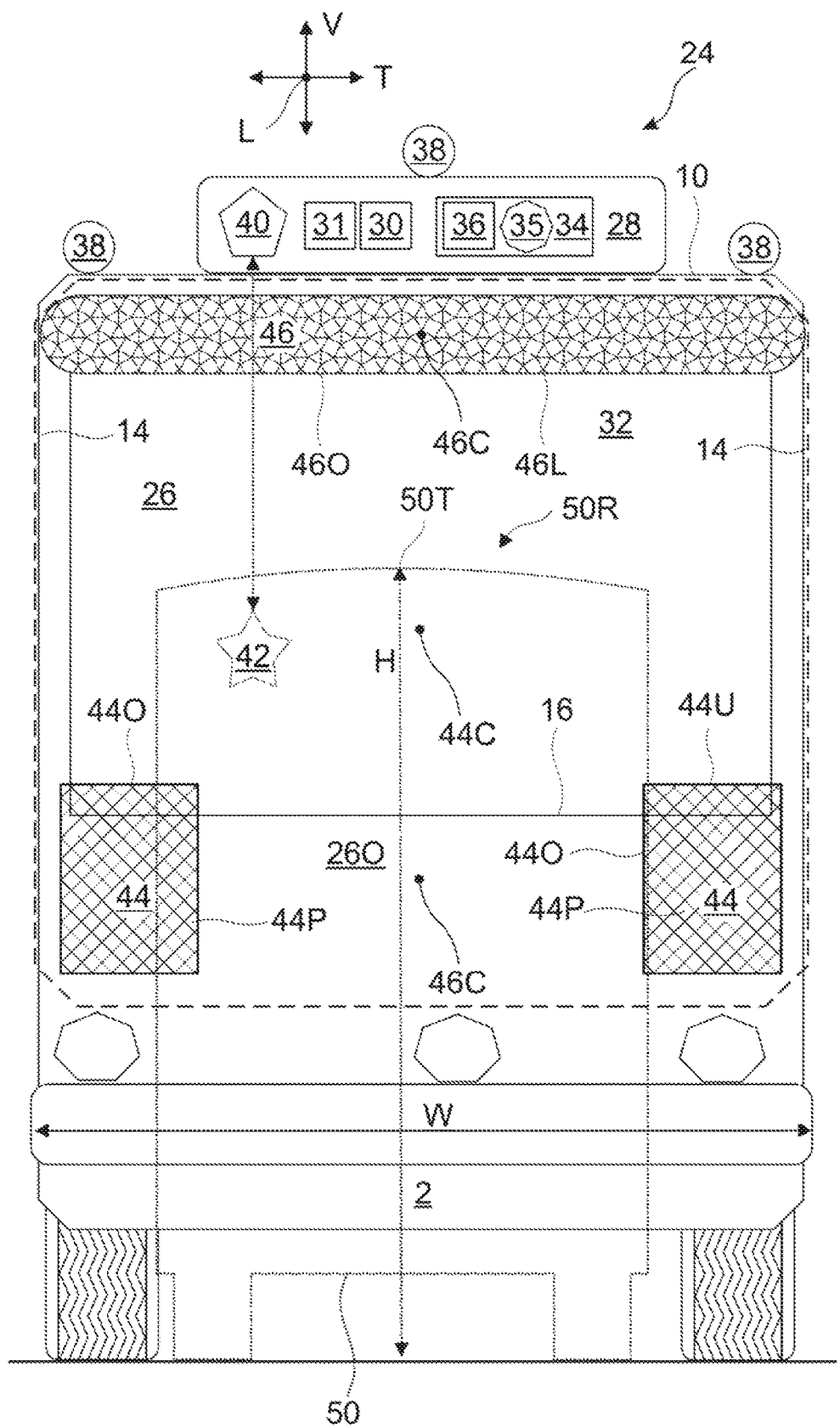
FIG. 3 provides a schematic illustration of a longitudinal view of a bus in accordance with a preferred embodiment of the invention.

FIG. 3 shows a longitudinal view of a bus 2 in accordance with a preferred embodiment of the invention. The bus 2 may correspond to those as described in relation with any one of FIGS. 1 and 2; and combination thereof. A vehicle 50 faces one longitudinal end of the bus 2. The transversal direction T, the vertical direction V and the longitudinal direction L are represented.

The bus 2 may comprise a lighting system 24 with a lighting surface 26, or light emitting surface. The lighting system 24 is adapted for displaying at least one luminous picture 46, notably a first luminous picture 44 and a second luminous picture 46. The first luminous picture 44 and the second luminous picture 46 may be displayed selectively, or simultaneously by combining them. More generally, the lighting system 24 is adapted for displaying a first lighting configuration and a second lighting configuration with the lighting surface 26. The first luminous picture and the second luminous picture may be displayed by different proportions, or different percentages, of the lighting surface 26. In order to display the luminous pictures 44 and 46, the lighting surface 26 may keep portions that are switched off.

The lighting system 24 may be at distance from each bumper 20, notably vertically at distance from the or each bumper 20. The lighting surface 26 may have a transversal width of at least 1 m, and a height of at least 1 m. The lighting surface 26 may have a width of at least 2 m, and a height of at least 2 m. The lighting surface 26 may extend on the majority of the width W of the bus 2, or essentially on the whole width W of the bus 2. The width W may be measured along the transversal direction T. The height of the lighting surface 26, and/or of the luminous pictures, may be measured from the lowermost point to the uppermost point.

The bus 2 may further comprise a monitoring system 28. The monitoring system 28 may comprise a vehicle detection module 30 configured for monitoring other vehicles 50 (only one represented) in the surrounding of the bus 2. The vehicle detection module 30 may be adapted for, simultaneously, calculating the position of the detected vehicles 50 with respect to the environment in which the bus 2 moves, and/or with respect to the bus 2; which may ease calculation when the bus 2 drives.

The other vehicles 50 may be stationary or driving ones. These other vehicles 50 may be approaching while the bus 2 is stationary. The monitoring system 28 may be adapted for calculation the speed of the others vehicles 50.

The monitoring system 28 may further comprise a height obtaining module 31. The height obtaining module 31 may be configured for obtaining the size of the detected vehicle(s) 50 by the vehicle detection module 30. The height obtaining module 31 may be adapted for calculating the size of at least one or each of the detected vehicle 50. As an alternative, the height H of the detected vehicle(s) 50 may be communicated by other devices, notably directly by the detected vehicle(s).

Road infrastructures may also provide the heights H of the vehicles.

The lighting system 24 may be configured for displaying a luminous picture at least partially or totally above the height H of the detected vehicle. In case of several vehicles, the considered heights H may be the greatest height. Accordingly, the second luminous picture may be displayed by the lighting surface 26 from a location above the vehicle(s), and thus above the top 50 T of the vehicle 50. By way of illustration, the second luminous picture may be projected from a raised location with respect to the roof(s) 50R of the identified vehicle(s) 50. In the current figure, the roof 50R is curved, for instance convex. However, it may exhibit other shapes. The height H of the vehicle 50 may vary longitudinally.

The lighting surface 26 may be formed by at least one, or several screens. The lighting surface 26 may be formed by at least one, or several matrices 32 of Light Emitting Diodes (LED). The diodes (not represented) forming at least one of the matrices 32 may have a pitch of about 20 mm. It may be understood that the diodes form a meshing, also designated as grid, with square meshes of about 20 mm. Triangular meshes or other shapes are considered as well.

Since the windows 16 are transparent, the lighting surface 26 and notably the matrices 32 may be transparent. For instance, at least one or each matrix 32 may exhibit a transparency of at least 40%, or more generally comprised between 10% and 50%; or 30% and 45%. A transparency of at least 40% may be understood as allowing a light passage of at least 40% through said matrix 32.

The bus 2 may comprise a computer 34. The computer 34 may comprise a computer readable medium 36 and a processing unit 35. The computer readable medium 36 may support a source code for carrying out a lighting process, notably in accordance with the invention. The computer 34 may be connected to the lighting system 24 in order to allow a communication with the monitoring system 28, and notably with the vehicle detection module 30.

At least one camera 38 may be used in order to detect other vehicles. Data provided by the cameras 38 may be sent to the vehicle detection module 30. Image recognition may be used for this purpose. The cameras 38 may be distributed on the upper surface of the roof 10. Cameras 38 may be arranged on or within an equipment casing supported by the roof 10. Several cameras 38 may provide data to the monitoring system 28. In the current figure, three cameras are represented, however any number of cameras 38 is suitable. At least two, three, or four cameras 38 is convenient for calculating the height, and possibly distances from the bus 2.

As an alternative or in addition, communication means 40 may be used in order to obtain data from outer control system(s) 42 providing information on other vehicles. Said information may comprise the position and/or the height of said vehicle. Communication may be achieved through WIFI or 5G telecommunication standards.

The first lighting configuration and the second lighting configuration may be displayed by different percentages of the lighting surface 26. They may be displayed by different portions thereof. They may be displayed by different surfaces. By way of illustration, they may be displayed by different numbers of pixels and/or LEDs of the matrix 32. By way of example, the area of the first luminous picture 44 may be greater than the area of the second luminous picture 46. The first luminous picture 44 may be formed by several portions of the lighting surface 26, and thus may comprise several first portions 44P. The first portions 44P may be at distance from each other. The lighting surface 26 may comprise an off portion 260 separating them. The same may apply to the second luminous picture 46.

By way of example, the first luminous picture 44 may comprise a breaking luminous signal which is displayed when the bus 2 activates its brakes. For instance, the bus driver may stop said bus 2. The second luminous picture 46 may comprise a warning luminous signal dedicated to the vehicle 50. It may be a flashing warning luminous signal. The second luminous picture 46 may be transversally centred on the vehicle 50 in order to catch his attention more strikingly, or the attention of other vehicles arriving. Thus, different levels of safety are provided to the environment, As an alternative, the first luminous picture 44 may comprise a warning signal initiated by the bus driver, for instance during a stop phase or a starting phase. The second luminous picture 46 may comprise a warning signal with a higher luminous intensity and/or a higher flashing frequency than the first luminous picture 44.

The first luminous picture 44 and the second luminous picture 46 may have different shapes. They may have different outlines 44O and 46O. They may be displayed by different areas of the lighting surface 26. The percentages of the lighting surface 26 displaying them may differ. The first outline 44O may be longer than the second outline 46O. It may be understood that the line forming the first outline 44O is longer than the line forming the first outline 44O. In case of different portions 44P, the lengths of the lines forming the outlines may be added.

The first luminous picture 44 and the second luminous picture 46 may comprise a first outline 44O and a second outline 46O respectively. These outlines 44O and 46O, or contours, may have different shapes, notably different geometries. The side numbers may change, angles too. The outlines 44O and 46O may be at distance from one another.

The first portions 44P of the first luminous picture 44 may be below the top 50T of the vehicle 50. They may be totally under le level of the height H of the vehicle 50. The first centre 44C of the first luminous picture 44 may be between the first portions 44P. It may be vertically level with the vehicle 50, thus under the height H. Said first centre 44C may be at the middle of the first portions 44P. Thus, the first luminous picture 44 may be totally or partially hidden by said vehicle 50. Then, the first luminous picture 44 is well seen by the vehicle 50 immediately behind the bus 2. Yet, further vehicles (not represented) may not see this picture and the information communicated therethrough.

The second centre 46C of the second luminous picture 46 may be vertically at distance from the top 50T of the vehicle 50. It may be at distance from the first centre 44C. In addition, the second outline 46O of the second luminous picture 46 may be vertically at distance from the first outlines 44O of the first luminous picture 44. These outlines 44O and 46O may be separated by a rectangular switched off portion of the lighting surface 26.

The second luminous picture 46 may be transversally larger than the first luminous picture 44. It may extend from one side wall 14 to the transversally opposite side wall 14. It may be transversally as large than the vehicle 50.

The second luminous picture 46 may comprise a lowermost point 46L which is at a higher location than the uppermost point 44U of the first luminous picture 44. These points 44U and 46L may be vertically distant from each other. These points 44U and 46L may be formed by the corresponding outlines 44O and 46O.

Thereby, the position of the second luminous picture 46 is adapted to the presence of the vehicle 50, and notably to its height H. The information of the second luminous picture 46 is displayed to more drivers.

Figure 4:
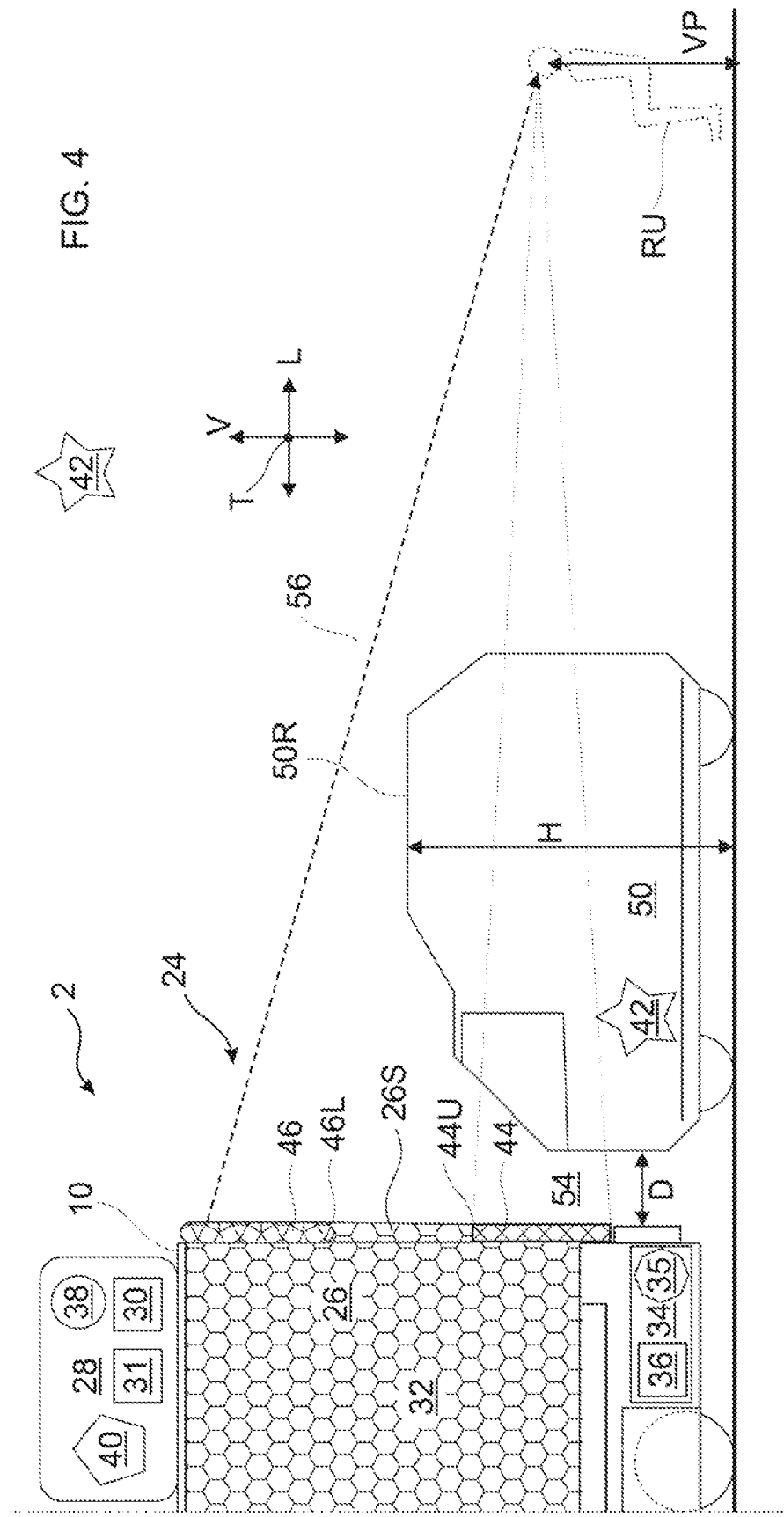
FIG. 4 provides a side view of a bus in accordance with a preferred embodiment of the invention.

FIG. 4 shows a side view of a bus 2 in accordance with a preferred embodiment of the invention. The bus 2 is partially represented, and may correspond to those as described in relation with any one of FIGS. 1 to 3; and combination thereof. The current figure may further illustrate FIG. 3 with another observation point. A vehicle 50 faces one longitudinal end of the bus 2. The transversal direction T, the vertical direction V and the longitudinal direction L are represented. The bus 2 may comprise a lighting system 24 with a lighting surface 26, or light emitting surface. The lighting system 24 is adapted for displaying at least one luminous picture 46, notably a first luminous picture 44 and a second luminous picture 46. The first luminous picture 44 and the second luminous picture 46 may be displayed selectively, or simultaneously by adding or combining them.

More generally, the lighting system 24 is adapted for displaying a first lighting configuration and a second lighting configuration with the lighting surface 26. The first luminous picture and the second luminous picture may be displayed by different proportions, or different percentages, of the lighting surface 26. In order to display the luminous pictures 44 and 46, the lighting surface 26 may keep portions that are switched off. The lighting system 24 may be at distance from each bumper 20, notably vertically at distance from the or each bumper 20.

The bus 2 may further comprise a monitoring system 28. The monitoring system 28 may comprise a vehicle detection module 30 configured for monitoring other vehicles 50 (only one represented) in the surrounding of the bus 2. The vehicle detection module 30 may be adapted for, simultaneously, calculating the position of the detected vehicles 50 with respect to the environment in which the bus 2 moves, and/or with respect to the bus 2; which may ease calculation when the bus 2 drives.

The other vehicles 50 may be stationary or driving ones. These other vehicles 50 may be approaching while the bus 2 is stationary. The monitoring system 28 may be adapted for calculation the speed of the others vehicles 50.

The monitoring system 28 may further comprise a height obtaining module 31. The height obtaining module 31 may be configured for obtaining the size of the detected vehicle(s) 50 by the vehicle detection module 30. The height obtaining module 31 may be adapted for calculating the size of at least one or each of the detected vehicle 50. As an alternative, the height H of the detected vehicle(s) 50 may be communicated by other devices, notably directly by the detected vehicle(s). Road infrastructures may also provide the heights H of the vehicles. The monitoring system 28 may also measure the longitudinal distance D, or separating gap, between the vehicle 50 and the bus 2. The lighting system 24 may be configured for displaying a luminous picture at least partially or totally above the height H of the detected vehicle. In case of several vehicles, the considered heights H may be the greatest height. Accordingly, the second luminous picture may be displayed by the lighting surface 26 from a location above the vehicle(s), and thus above the top 50 T of the vehicle 50. By way of illustration, the second luminous picture may be projected from a raised location with respect to the roof(s) 50R of the identified vehicle(s) 50. In the current figure, the roof 50R has different levels. The height varies along the longitudinal direction L. Then, the considered height H in the context of the invention is the summit of the roof 50R of the vehicle 50. The lighting surface 26 may be formed by at least one, or several screens. The lighting surface 26 may be formed by at least one, or several matrices 32 of Light Emitting Diodes (LED). The diodes (not represented) forming at least one of the matrices 32 may have a pitch of about 20 mm. It may be understood that the diodes form a meshing, also designated as grid, with square meshes of about 20 mm. Triangular meshes or other shapes are considered as well.

Since the windows 16 are transparent, the lighting surface 26 and notably the matrices 32 may be transparent. For instance, at least one or each matrix 32 may exhibit a transparency of at least 40%, or more generally comprised between 10% and 50%; or 30% and 45%. A transparency of at least 40% may be understood as allowing a light passage of at least 40% through said matrix 32.

The bus 2 may comprise a computer 34. The computer 34 may comprise a computer readable medium 36 and a processing unit 35. The computer readable medium 36 may support a source code for carrying out a lighting process, notably in accordance with the invention. The computer 34 may be connected to the lighting system 24 in order to allow a communication with the monitoring system 28, and notably with the vehicle detection module 30.

At least one camera 38 may be used in order to detect other vehicles. Data provided by the cameras 38 may be sent to the vehicle detection module 30. Image recognition may be used for this purpose. As an alternative or in addition, communication means 40 may be used in order to obtain data from outer control system(s) 42 providing information on other vehicles. Said information may comprise the position and/or the height of said vehicle. Communication may be achieved through WIFI or 5G telecommunication standards.

The second luminous picture 46 may comprise a lowermost point 46L over the uppermost point 44U of the first luminous picture 44. These points 44U and 46L may be vertically distant from each other. These points 44U and 46L may be separated by a separating portion 26S of the lighting surface.

A road user RU is represented behind the vehicle 50. The road user RU may be a car driver, or may drive a motorbike. Due to the height H of the vehicle 50, there is a blind spot 54 between the bus 2 and said vehicle 2 with respect to the road user RU. The road user RU cannot see a pedestrian or an animal in the blind spot 54. The size of this blind spot 54 may be of at the height H. Accordingly, with respect to the road user RU, the first luminous picture 44 is at least partially or totally hidden by the vehicle 50 since it is in contact of the blind spot 54. The blind spot 54 may be a space, with a volume.

The second luminous picture 46 may comprise a light beam 56 reaching the road user RU is spite that said road user RU is smaller than the roof 50R of the vehicle 50. The light beam is in the vision field of the road user. The vertical position VP of his eyes may be smaller than the height H. The vertical position VP may be calculated or at least estimated by optical means and computer aided recognition means.

Then, the road user RU perceives the warning message the bus 2 intends to share since said road user RU can observe the second luminous picture 46, partially or totally.

Figure 5:
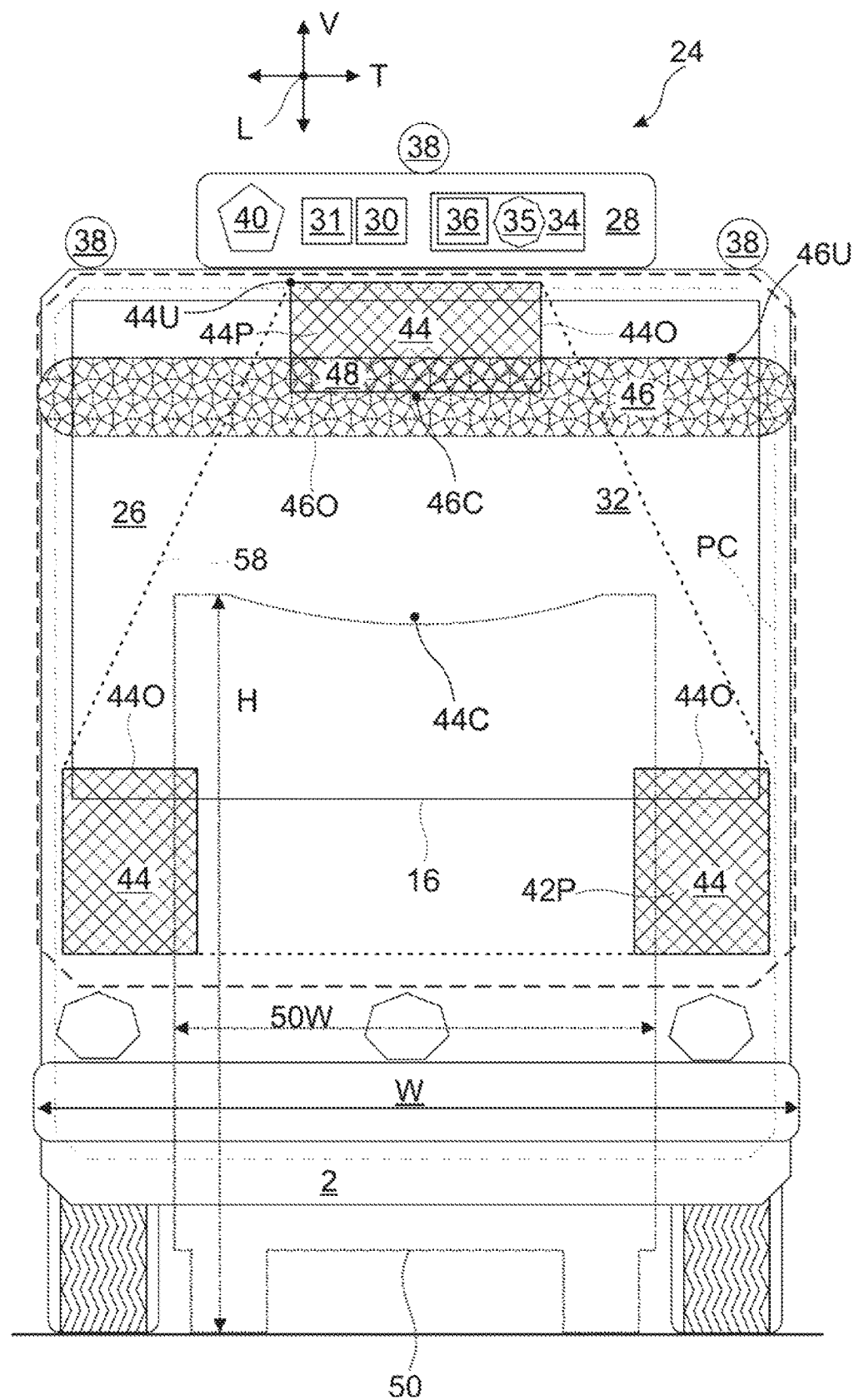
FIG. 5 provides a schematic illustration of a longitudinal view of a vehicle in accordance with a preferred embodiment of the invention.

FIG. 5 shows a longitudinal view of a bus 2 in accordance with a preferred embodiment of the invention. The bus 2 may correspond to those as described in relation with any one of FIGS. 1 to 4; and combination thereof. A vehicle 50 faces one longitudinal end of the bus 2. The transversal direction T, the vertical direction V and the longitudinal direction L are represented.

The bus 2 may comprise a lighting system 24 with a lighting surface 26, or light emitting surface. The lighting system 24 is adapted for displaying at least one luminous picture 46, notably a first luminous picture 44 and a second luminous picture 46. The first luminous picture 44 and the second luminous picture 46 may be displayed selectively, or simultaneously.

More generally, the lighting system 24 is adapted for displaying a first lighting configuration and a second lighting configuration with the lighting surface 26. The first luminous picture and the second luminous picture may be displayed by different proportions, or different percentages, of the lighting surface 26. In order to display the luminous pictures 44 and 46, the lighting surface 26 may keep portions that are switched off. The lighting system 24 may be at distance from each bumper 20, notably vertically at distance from the or each bumper 20.

The bus 2 may further comprise a monitoring system 28. The monitoring system 28 may comprise a vehicle detection module 30 configured for monitoring other vehicles 50 (only one represented) in the surrounding of the bus 2. The vehicle detection module 30 may be adapted for, simultaneously, calculating the position of the detected vehicles 50 with respect to the environment in which the bus 2 moves, and/or with respect to the bus 2; which may ease calculation when the bus 2 drives.

The other vehicles 50 may be stationary or driving ones. These other vehicles 50 may be approaching while the bus 2 is stationary. The monitoring system 28 may be adapted for calculation the speed of the others vehicles 50.

The monitoring system 28 may further comprise a height obtaining module 31. The height obtaining module 31 may be configured for obtaining the size of the detected vehicle(s) 50 by the vehicle detection module 30. The height obtaining module 31 may be adapted for calculating the size of at least one or each of the detected vehicle 50. As an alternative, the height H of the detected vehicle(s) 50 may be communicated by other devices, notably directly by the detected vehicle(s).

Road infrastructures may also provide the heights H of the vehicles.

The lighting system 24 may be configured for displaying a luminous picture at least partially or totally above the height H of the detected vehicle. In case of several vehicles, the considered heights H may be the greatest height. Accordingly, the second luminous picture may be displayed by the lighting surface 26 from a location above the vehicle(s), and thus above the top 50 T of the vehicle 50. By way of illustration, the second luminous picture may be projected from a raised location with respect to the roof(s) 50R of the identified vehicle(s) 50. In the current figure, the roof 50R is curved, for instance concave. The considered height H of the vehicle 50 may be measured on the summit of the roof 50R.

The lighting surface 26 may be formed by at least one, or several screens. The lighting surface 26 may be formed by at least one, or several matrices 32 of Light Emitting Diodes (LED). The diodes (not represented) forming at least one of the matrices 32 may have a pitch of about 20 mm. It may be understood that the diodes form a meshing, also designated as grid, with square meshes of about 20 mm. Triangular meshes or other shapes are considered as well.

Since the windows 16 are transparent, the lighting surface 26 and notably the matrices 32 may be transparent. For instance, at least one or each matrix 32 may exhibit a transparency of at least 40%, or more generally comprised between 10% and 50%; or 30% and 45%. A transparency of at least 40% may be understood as allowing a light passage of at least 40% through said matrix 32.

The bus 2 may comprise a computer 34. The computer 34 may comprise a computer readable medium 36 and a processing unit 35. The computer readable medium 36 may support a source code for carrying out a lighting process, notably in accordance with the invention. The computer 34 may be connected to the lighting system 24 in order to allow a communication with the monitoring system 28, and notably with the vehicle detection module 30.

At least one camera 38 may be used in order to detect other vehicles. Data provided by the cameras 38 may be sent to the vehicle detection module 30. Image recognition may be used for this purpose. The cameras 38 may be distributed on the upper surface of the roof 10. Cameras 38 may be arranged on or within an equipment housing supported by the roof 10. Several cameras 38 may provide data to the monitoring system 28. In the current figure, two cameras are represented, however any number of cameras 38 is suitable. At least two or three cameras 38 is convenient for calculating the height, and possibly distance from the bus 2.

As an alternative or in addition, communication means 40 may be used in order to obtain data from outer control system(s) 42 providing information on other vehicles. Said information may comprise the position and/or the height of said vehicle. Communication may be achieved through WIFI or 5G telecommunication standards.

The first luminous picture 44 and the second luminous picture 46 may exhibit an overlapping area 48. In the overlapping area 48, the luminous pictures 44 and 46 may be displayed by adding their light intensities. As an alternative, it may be defined that the second luminous picture 46 has a priority over the first luminous picture 44 such that when the second luminous picture 46 is displayed, the first luminous picture 44 is switched off in the overlapping area 48.

The first luminous picture 44, and notably its first portions 44P, may be distributed on substantially the whole height and/or the whole width of the lighting surface 26, or at least a majority of the height and/or the majority of the width. The first luminous picture 44 may be vertically taller than the second luminous picture 46. The uppermost point 44U of the first luminous picture 44 may be at a higher location than the uppermost point 46U of the second luminous picture 46. Their summits may be at different heights. The second luminous picture 46 may be between different portions of the first luminous picture 44. Portions of the lighting surface 26 may be switched off, for instance around the second luminous picture 46 and within the first luminous picture 44. Thus, allowing an energy saving.

The first luminous picture 44 comprise a first centre 44C. This first centre 44C may be between its first portions 44P. In the current example, three first portions 44P are provided; however this number may be increased. The first centre 44C may be the centre of gravity of the first portions, or the centre of a polygon 58 in which the first portions 44P are inscribed. The polygon 58 may mate with sides of the first outlines 44O. It is apparent that the first centre 44C is below the second centre 46C. Thus, the second luminous picture 46 is essentially above the first luminous picture 44. It may be understood that by contrast with the first luminous picture 44, the second luminous picture 46 is gathered at a higher location, notably above the height H. Thus, the second luminous picture 46 is not blocked by the vehicle 50, and may be perceived by more road users.

The second luminous picture 46 may extend on the majority of the width W of the bus 2, or the whole width W of the bus 2. The second luminous picture 46 may span on the whole width of the window 16, or the whole width of the passenger compartment PC. The second luminous picture 46 may be transversally larger than the second luminous picture 46.

The second luminous picture 46 may comprise a transversal width which is larger than the width 50W of the vehicle 50. More precisely, the lighting system 24 may be configured such that the second luminous picture 46 is broader than the vehicle. The width 50W of the vehicle 50 may be calculated by the monitoring system 50.

Figure 6:
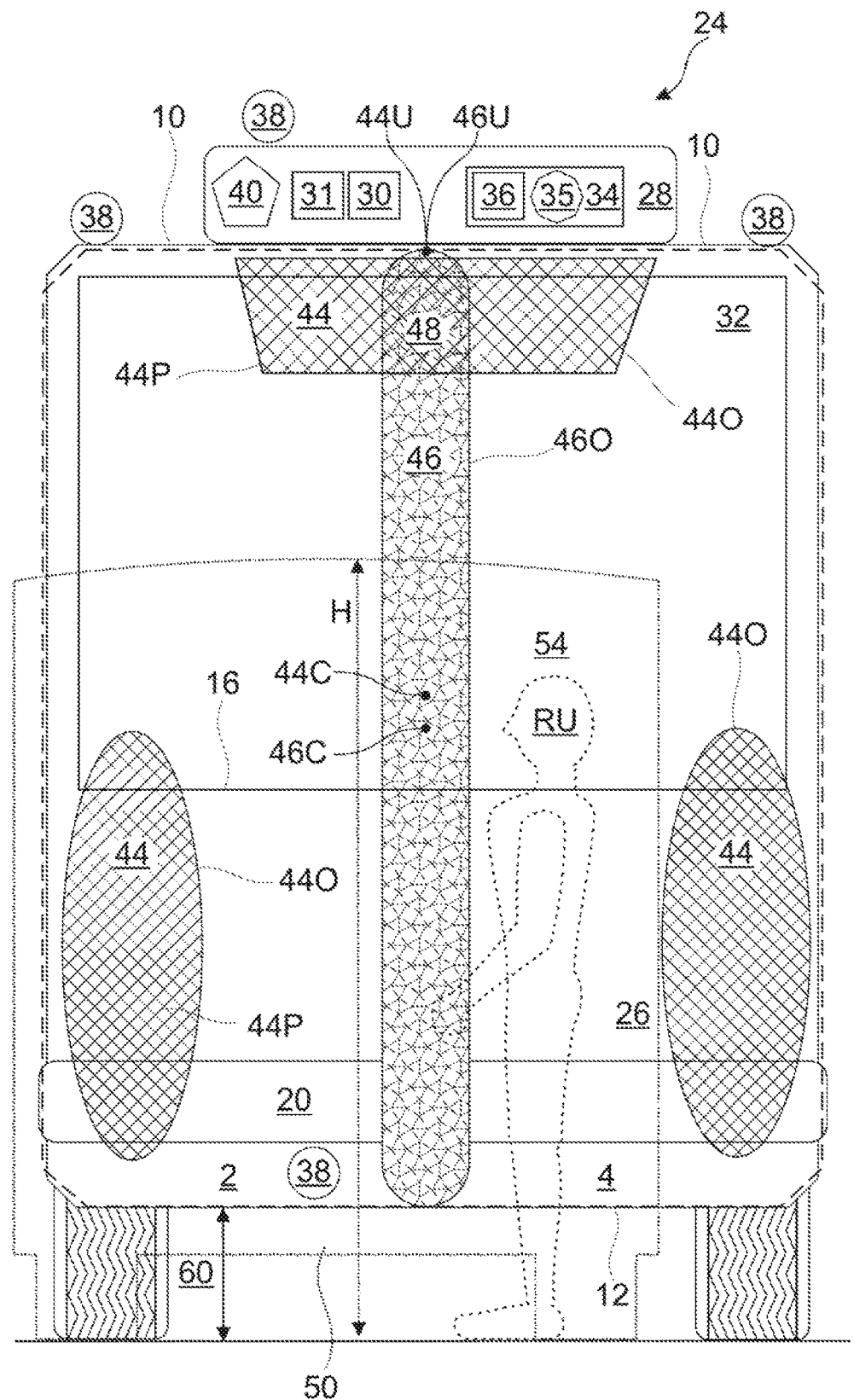
FIG. 6 provides a schematic illustration of a longitudinal view of a vehicle in accordance with a preferred embodiment of the invention.

FIG. 6 shows a longitudinal view of a bus 2 in accordance with a preferred embodiment of the invention. The bus 2 may correspond to those as described in relation with any one of FIGS. 1 to 5; and combination thereof. A vehicle 50 faces one longitudinal end of the bus 2. A road user RU such as a pedestrian is represented, and may be between the bus 2 and the vehicle 50, in the blind spot 54 therebetween. Thus, another vehicle approaching the blind sport 54 may knock over the road user RU if they move too fast. The transversal direction T, the vertical direction V and the longitudinal direction L are represented.

The bus 2 may comprise a lighting system 24 with a lighting surface 26, or light emitting surface. The lighting system 24 is adapted for displaying at least one luminous picture 46, notably a first luminous picture 44 and a second luminous picture 46.

More generally, the lighting system 24 is adapted for displaying a first lighting configuration and a second lighting configuration with the lighting surface 26. The first luminous picture and the second luminous picture may be displayed by different proportions, or different percentages of the lighting surface 26. In order to display the luminous pictures 44 and 46, the lighting surface 26 may keep portions that are switched off.

The lighting system 24 may cover at least one bumper 20, notably the rear bumper 20. The lighting surface 26 may extend below and above the bumper 20. The lighting surface 26 may extend from the roof 10 to the platform 12. It may be above the ground clearance 60. The first luminous picture 44 may cross the bumper 20, notably through its lower first portions 44P. The second luminous picture 46 may cross vertically the bumper 20. The ground clearance 60 may measure at most: 30 cm, or 15 cm. The bus 2 may be a low floor bus, thus the lighting surface 26 may be brought closer to the ground, and its height may be increased in order to improve safety.

The bus 2 may further comprise a monitoring system 28. The monitoring system 28 may comprise a vehicle detection module 30 configured for monitoring other vehicles 50 (only one represented) in the surrounding of the bus 2. The vehicle detection module 30 may be adapted for, simultaneously, calculating the position of the detected vehicles 50 with respect to the environment in which the bus 2 moves, and/or with respect to the bus 2; which may ease calculation when the bus 2 drives.

The other vehicles 50 may be stationary or driving ones. These other vehicles 50 may be approaching while the bus 2 is stationary, The monitoring system 28 may be adapted for calculation the speed of the others vehicles 50.

The monitoring system 28 may further comprise a height obtaining module 31. The height obtaining module 31 may be configured for obtaining the size of the detected vehicle(s) 50 by the vehicle detection module 30. The height obtaining module 31 may be adapted for calculating the size of at least one or each of the detected vehicle 50. As an alternative, the height H of the detected vehicle(s) 50 may be communicated by other devices, notably directly by the detected vehicle(s). Road infrastructures may also provide the heights H of the vehicles.

The lighting system 24 may be configured for displaying a luminous picture at least partially or totally above the height H of the detected vehicle. In case of several vehicles, the considered heights H may be the greatest height. Accordingly, the second luminous picture may be displayed by the lighting surface 26 from a location above the vehicle(s), and thus above the top 50 T of the vehicle 50. By way of illustration, the second luminous picture may be projected from a raised location with respect to the roof(s) 50R of the identified vehicle(s) 50.

The lighting surface 26 may be formed by at least one, or several screens. The lighting surface 26 may be formed by at least one, or several matrices 32 of Light Emitting Diodes (LED). The diodes (not represented) forming at least one of the matrices 32 may have a pitch of about 20 mm. It may be understood that the diodes form a meshing, also designated as grid, with square meshes of about 20 mm. Triangular meshes or other shapes are considered as well.

Since the windows 16 are transparent, the lighting surface 26 and notably the matrices 32 may be transparent. For instance, at least one or each matrix 32 may exhibit a transparency of at least 40%, or more generally comprised between 10% and 50%; or 30% and 45%. A transparency of at least 40% may be understood as allowing a light passage of at least 40% through said matrix 32.

The bus 2 may comprise a computer 34. The computer 34 may comprise a computer readable medium 36 and a processing unit 35. The computer readable medium 36 may support a source code for carrying out a lighting process, notably in accordance with the invention. The computer 34 may be connected to the lighting system 24 in order to allow a communication with the monitoring system 28, and notably with the vehicle detection module 30.

At least one camera 38 may be used in order to detect other vehicles. Data provided by the cameras 38 may be sent to the vehicle detection module 30. Image recognition may be used for this purpose.

At least one camera 38 may be arranged under the bumper 20.

As an alternative or in addition, communication means 40 may be used in order to obtain data from outer control system(s) 42 providing information on other vehicles. Said information may comprise the position and/or the height of said vehicle. Communication may be achieved through WiFI or 5G telecommunication standards.

The first luminous picture 44 may be transversally larger than the second luminous picture 46.

The first luminous picture 44, and notably its portions 44P, may be distributed on substantially the whole height and/or the whole width of the lighting surface 26, or at least a majority of the height and/or the majority of the width. The first luminous picture 44 may be vertically smaller than the second luminous picture 46.

The second luminous picture 46 may extend on the whole height of the lighting surface 26. It may form a vertical strip. It may divide the lighting surface 26. The first luminous picture 44, and notably its first portions 44P may be distributed on the whole width of the lighting surface 26.

The first luminous picture 44 may comprise several first portions 44P, for instance three. The second luminous picture 46 may cross or overlap the upper one. Their overlapping area 48, also designated as common area, may form a vertical strip. The first luminous picture 44 and the second luminous picture 46 may have uppermost points 44U and 46U at the same level, possibly at the same location. The outlines 44O and 46O may touch each other.

The first centre 44C of the first luminous picture 44 may be above the second centre 46C of the second luminous picture 46. The first luminous picture 44 may comprise a first portion 44P above the height H. However, the second luminous picture 46 is the one which keeps the most important proportion above the vehicle 50. Indeed, the second luminous picture 46 comprises a second proportion above the height H which is greater than the first proportion of the first luminous picture 44 above the height 50.

Thus, the second luminous picture 46 remains more efficient for warning other vehicles from a danger such as a road user RU in the blind area 54 delimited by the vehicle 50 and the bus 2.

Figure 7:
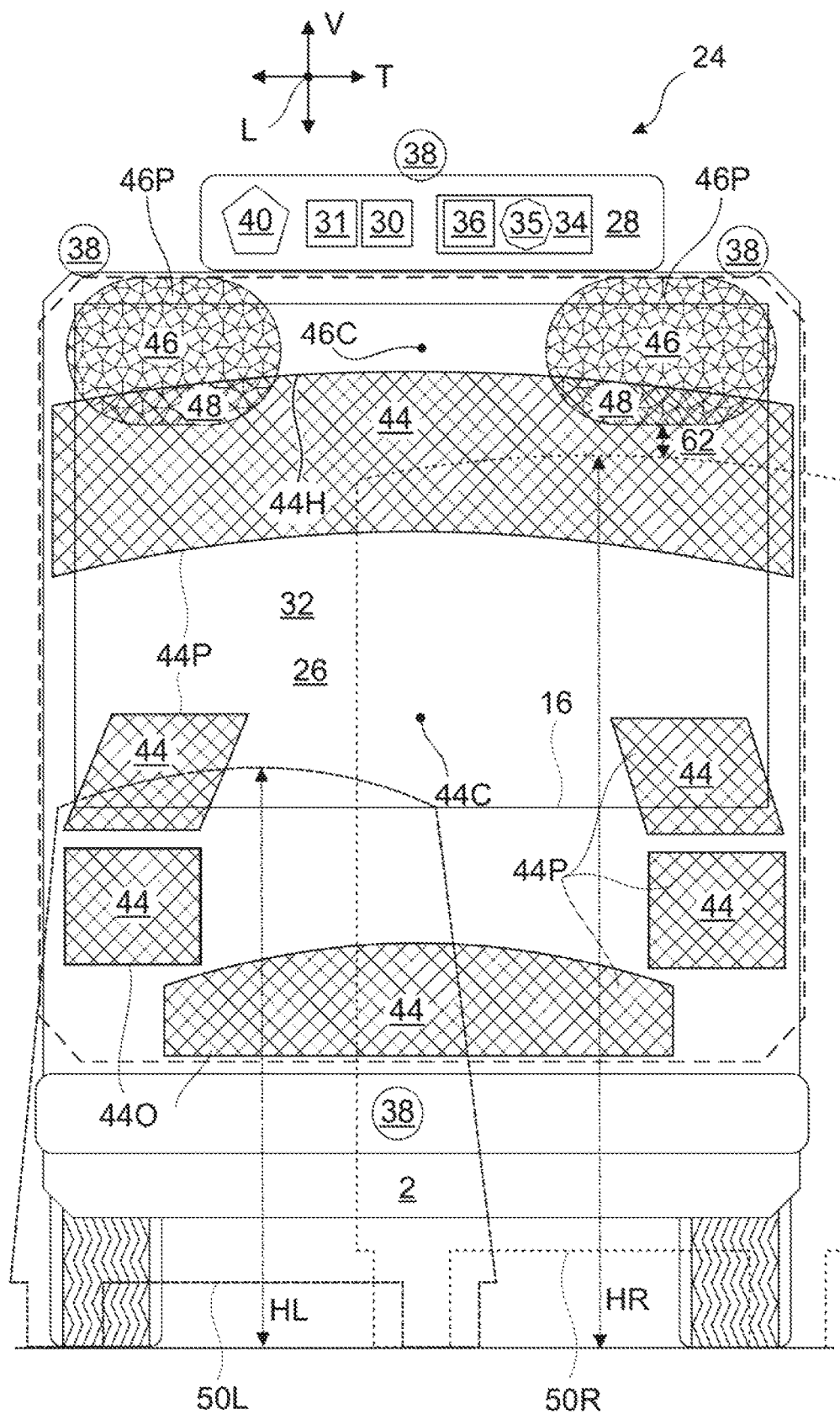
FIG. 7 provides a schematic illustration of a of a vehicle in accordance with a preferred embodiment of the invention.

FIG. 7 shows a longitudinal view of a bus 2 in accordance with a preferred embodiment of the invention. The bus 2 may correspond to those as described in relation with any one of FIGS. 1 to 6; and combination thereof. Two vehicles 50 face one longitudinal end of the bus 2. The transversal direction T, the vertical direction V and the longitudinal direction L are represented.

The bus 2 may comprise a lighting system 24 with a lighting surface 26, or light emitting surface. The lighting system 24 is adapted for displaying at least one luminous picture 46, notably a first luminous picture 44 and a second luminous picture 46.

More generally, the lighting system 24 is adapted for displaying a first lighting configuration and a second lighting configuration with the lighting surface 26. The first luminous picture and the second luminous picture may be displayed by different proportions, or different percentages, of the lighting surface 26. In order to display the luminous pictures 44 and 46, the lighting surface 26 may keep portions that are switched off.

The bus 2 may further comprise a monitoring system 28. The monitoring system 28 may comprise a vehicle detection module 30 configured for monitoring other vehicles 5 (only one represented) in the surrounding of the bus 2. The vehicle detection module 30 may be adapted for, simultaneously, calculating the position of the detected vehicles 50 with respect to the environment in which the bus 2 moves, and/or with respect to the bus 2; which may case calculation when the bus 2 drives.

The other vehicles 50 may be stationary or driving ones. These other vehicles 50 may be approaching while the bus 2 is stationary. The monitoring system 28 may be adapted for calculation the speed of the others vehicles 50.

The monitoring system 28 may further comprise a height obtaining module 31. The height obtaining module 31 may be configured for obtaining the size of the detected vehicle(s) 50 by the vehicle detection module 30. The height obtaining module 31 may be adapted for calculating the size of at least one or each of the detected vehicle 50. As an alternative, the height H of the detected vehicle(s) 50 may be communicated by other devices, notably directly by the detected vehicle(s). Road infrastructures may also provide the heights H of the vehicles.

The lighting system 24 may be configured for displaying a luminous picture at least partially or totally above the height H of the detected vehicle. Accordingly, the second luminous picture may be displayed by the lighting surface 26 from a location above the vehicle(s), and thus above the top 50 T of the vehicle 50. By way of illustration, the second luminous picture may be projected from a raised location with respect to the roof(s) 50R of the identified vehicle(s) 50.

The lighting surface 26 may be formed by at least one, or several screens. The lighting surface 26 may be formed by at least one, or several matrices 32 of Light Emitting Diodes (LED). The diodes (not represented) forming at least one of the matrices 32 may have a pitch of about 20 mm. It may be understood that the diodes form a meshing, also designated as grid, with square meshes of about 20 mm. Triangular meshes or other shapes are considered as well.

Since the windows 16 are transparent, the lighting surface 26 and notably the matrices 32 may be transparent. For instance, at least one or each matrix 32 may exhibit a transparency of at least 40%, or more generally comprised between 10% and 50%; or 30% and 45%. A transparency of at least 40% may be understood as allowing a light passage of at least 40% through said matrix 32.

The bus 2 may comprise a computer 34. The computer 34 may comprise a computer readable medium 36 and a processing unit 35. The computer readable medium 36 may support a source code for carrying out a lighting process, notably in accordance with the invention. The computer 34 may be connected to the lighting system 24 in order to allow a communication with the monitoring system 28, and notably with the vehicle detection module 30.

At least one camera 38 may be used in order to detect other vehicles. Data provided by the cameras 38 may be sent to the vehicle detection module 30. Image recognition may be used for this purpose.

At least one camera 38 may be arranged below the bumper 20.

As an alternative or in addition, communication means 40 may be used in order to obtain data from outer control system(s) 42 providing information on other vehicles. Said information may comprise the position and/or the height of said vehicle. Communication may be achieved through WIFI or 5G telecommunication standards.

In the current embodiment, the first luminous picture 44 comprise several first portions 44P, for instance six. The first portions 44P may have different shapes, different first outlines 44O. They may be curved, concave or convex. They may form parallelograms. The first portions may be distributed around the contour of the lighting surface 26.

The second luminous picture 46 may comprise at least two second portions 46P. The second portions 46P may be disposed at opposite sides of the lighting surface 26. They may be arranged at the top of said lighting surface 26. The second centre 46C may be at the middle of the second portions 46P. The second centre 46C may be over the first centre 44C. The second portions 46P may be above the first portions 44P, preferably each first portion 44P. They may overlap one of the first portions 44P. Two overlapping areas 48 may exist.

In the current embodiment, two vehicles 50L and 50R are represented. These vehicles may comprise a first vehicle and a second vehicle which are one behind the other, notably in the close vicinity of the bus 2. They may be on the same road line as the bus 2. For the sake of clarity, the vehicles are represented with a transversal offset, such that a left vehicle 50L and a right vehicle 50R may be distinguished. They may be a car and a van respectively.

The left vehicle 50L and the right vehicle 50R may have different heights, for instance a left height HL and a right HR respectively. By means of the monitoring system 28 of the bus 2, these heights may be calculated simultaneously. These heights HL and HR may measure 1.40 m and 2.30 m respectively. Alternatively, these heights HL and HR may be obtained simultaneously through the communication means 40.

It may be considered that the relevant height is the greatest height, which is the right height HR in the current illustration. Thus, the lighting system 24 may be configured for displaying the second luminous picture 46 above the right height HR. This ensures that light emitted avoids the vehicles 50L and 50R in order to warn further vehicles approaching behind.

A vertical margin 62 may be preserved between the second luminous picture 46 and the height H, notably between the roof(s) and the second portion(s). The vertical margin 62 may be a safety margin. It may measure at least: 5 cm, or 10 cm, or 20 cm. It may depend on the length and the distance with the vehicle(s).

The invention provides a preferred embodiment of the invention wherein of all features defined in relation with FIGS. 1 to 7 are combined together.

FIG. 8 provides a schematic illustration of a diagram block of a lighting process in accordance with the invention. The lighting process may be adapted for a vehicle sur as a bus; said bus possibly corresponding to any one of those as described in relation with FIGS. 1 to 7, and any combinations thereof.

The process may comprise the following steps:
displaying 100 the first luminous picture with the lighting surface of the lighting system,
detecting 102 a vehicle such as a car, a van or a motorbike, more generally a vehicle that is smaller than the bus,
obtaining 104 the height of the detected vehicle,
defining 106 a blind spot, notably between the bus and the vehicle,
identifying 108 a road user in the environment of the bus, for instance in the blind spot,
stop 110 displaying the first luminous picture, then
displaying 112 the second luminous picture with the lighting surface at least partially or totally above the height of the detected vehicle,
stop 114 displaying the second luminous picture.

Then after, the lighting process may resume step displaying the first luminous picture 100.

At step detecting 102, said vehicle exhibits standard dimensions. If the vehicle is an outsized vehicle, the bus may ignore it. Then the process may go on executing step detecting 102 in order to detect another vehicle, notably a vehicle which is smaller than the bus.

Steps displaying 100 the first luminous picture; defining 106 a blind spot; identifying 108; stop 110 displaying the first luminous picture; and stop 114 displaying the second luminous picture are purely optional in the context of the invention, indeed, step displaying 112 provide a relevant technical effect which solves a technical problem.

Steps 100 to 108 may be carried out simultaneously. As an alternative, they may be carried out in a different order.

As an option, at step displaying 112 the second luminous picture, if the vehicle is higher or as high as the bus, the upper most point of the second luminous picture uppermost touches the uppermost edge of the lighting surface. Thus, the lighting process may comprise a step comparing (not represented) the height of the bus and the height of the vehicle. Step comparing may be a step checking whether the bus, or the lighting surface, is in elevation with respect to the vehicle. As an option, step displaying 112 the second luminous picture is executed provided the bus is higher than the vehicle. Under another approach, step displaying 112 the second luminous picture is always executed, whatever the height of the vehicle is. Then the second luminous picture is at the top of the vehicle, or substantially at the top of the vehicle.

At step displaying 112, the luminous picture, the distance between the bus and the vehicle is smaller than a threshold distance.

More generally, at step displaying 112 the second luminous picture, the first luminous picture may be below the second luminous picture, and/or the second centre may be above the first centre, and/or a majority of the second luminous picture may be above a majority of the first luminous picture.

In addition, the lighting process may comprise a step calculating the blind spot formed by the inclined body of the articulated bus, notably when the articulated bus is in turning configuration. This blind spot may be considered with respect to the vehicle, or with respect to each vehicle in the bus environment. This blind spot may be considered as a danger, or more generally the angle configuration of the units may be considered as a danger for road users and/or vehicles around. Then, the second luminous picture is displayed at step displaying 112.

At step obtaining 104, the height is calculated by an inboard computer of the bus, it may use the monitoring system, and notably the cameras. Trigonometry may be used. As an alternative, the height may be communicated by a communication system of a third vehicle.

At step displaying 112, the luminous picture is displayed toward said vehicle, said vehicle notably being behind the bus and/or approaching said bus. They may have different speeds.

As an option, the lighting process may comprise a step boarding 200 during passengers enter and/or leave the bus. Step boarding 200 may trigger step displaying 100 the first luminous picture and/or step displaying 112 the second luminous picture. Step boarding 200 may continue during step displaying 112 the second luminous picture.

Step identifying 108 a road user may comprise the identification and/or the calculation of the vision field of the road user. The eyes of the road user may be detected, and the orientation as well. Then the position from which the second luminous picture is displayed may be calculated in order to cross on top the vehicle and to reach the road user with light beams.

It should be understood that the detailed description of specific preferred embodiments is given by way of illustration only, since various changes and modifications within the scope of the invention will be apparent to the person skilled in the art. The scope of protection is defined by the following set of claims.

The invention claimed is:

1. A bus comprising:
   a vehicle detection module configured for detecting a vehicle, wherein the detected vehicle is at least one of: a car, a van, and a motorbike;
   a height obtaining module configured for obtaining a height of the detected vehicle; and
   a lighting system with a lighting surface adapted for displaying a luminous picture at least partially above the height of the detected vehicle, wherein the luminous picture is a second luminous picture, the lighting surface being further configured for displaying a first luminous picture at least partially below the height of the detected vehicle, the lighting system being configured for selectively switching from the first luminous picture to the second luminous picture.

2. The bus in accordance with claim 1, wherein the bus comprises a window, the lighting surface extending on a majority of a surface of said window, the window being a rear window including a rear edge, the lighting surface overlapping said rear edge, and wherein the luminous picture is overlapping said rear edge.

3. The bus in accordance with claim 1, wherein the lighting system comprises a display screen including a matrix of light emitting diodes, said display screen forming the lighting surface, the display screen comprising a transparency of at least 40%.

4. The bus in accordance with claim 1, wherein the bus comprises a bumper and a summit, the lighting surface being vertically at a distance from the bumper and the summit; the bumper being longitudinally offset with respect to the lighting surface.

5. The bus in accordance with claim 1, wherein the bus comprises a monitoring system adapted for detecting a road user, the vehicle detection module being part of said monitoring system, the lighting system being configured for displaying the luminous picture upon detection of said road user.

6. The bus in accordance with claim 1, wherein the bus comprises a height of at least 3 m, and wherein the height of the vehicle ranges from 1.1 m to 2.5 m, and wherein the lighting surface comprises a width of at least 1.5 m and a height of at least 2 m.

7. A bus comprising:
   a vehicle detection module configured for detecting a rear vehicle,
   a height obtaining module configured for obtaining a height of the rear vehicle, and
   a lighting system with a lighting surface adapted for displaying:
   a first luminous picture, and
   a second luminous picture higher than the height of the rear vehicle, wherein the lighting system is configured for switching from the first luminous picture to the second luminous picture, wherein the first luminous picture comprises a first center, and the second luminous picture comprises a second center which is above the first center, the second center being above the height of the detected rear vehicle.

8. The bus in accordance with claim 7, wherein the lighting system is configured such that the first luminous picture is at least partially below the height of the rear vehicle.

9. The bus in accordance with claim 7, wherein the second luminous picture is higher than the first luminous picture, and the first luminous picture is lower than the second luminous picture.

10. The bus in accordance with claim 7, wherein the first luminous picture comprises a first area, the second luminous picture comprises a second area which is smaller than the first area, the second area representing at most 50% of the first area.

11. The bus in accordance with claim 7, wherein the first luminous picture defines a first width and a first height, the second luminous picture defines a second width and a second height, the first width being greater than the second width and the first height is greater than the second height; the first width and the first height extending on all of the width and all of the height of the lighting surface.

12. The bus in accordance with claim 7, wherein the first luminous picture defines a first lighting intensity, and the second luminous picture defines a second lighting intensity which is greater than the first lighting intensity.

13. The bus in accordance with claim 7, wherein the first luminous picture comprises a first outline, and the second luminous picture comprises a second outline which is shorter than the first outline.

14. The bus in accordance with claim 7, wherein the first luminous picture comprises a first number of first luminous portions distant from each other, and the second luminous picture comprises a second number of second luminous portions distant from each other, said first number being greater than the second number.

15. A bus comprising:
a window,
a vehicle detection module configured for detecting, a smaller vehicle which is smaller than the bus,
a height obtaining module configured for obtaining a height of said smaller vehicle, and
a lighting system with a lighting surface adapted for displaying a luminous picture at least partially above the height of said smaller vehicle, wherein the lighting surface extends on a majority of a surface of said window, wherein the luminous picture is a second luminous picture, the lighting surface being further configured for displaying a first luminous picture at least partially below the height of the detected smaller vehicle, the lighting system being configured for selectively switching from the first luminous picture to the second luminous picture.

16. The bus in accordance with claim 15, wherein the window comprises an upper edge, the lighting surface and the luminous picture overlapping said upper edge.

17. The bus in accordance with claim 15, wherein the window comprises a side portion at a side of the bus, and a rear portion at a rear end of the bus.

18. The bus in accordance with claim 15, wherein the bus is an articulated bus with a front unit and a rear unit, said rear unit comprising a rear unit rear window, the lighting surface extending on a majority of a surface of said rear unit rear window.

* * * * *